US006453173B1

(12) United States Patent
Reber et al.

(10) Patent No.: US 6,453,173 B1
(45) Date of Patent: Sep. 17, 2002

(54) HANDHELD DEVICE HAVING AN OPTICAL DATA READER

(75) Inventors: William L. Reber, Schaumburg, IL (US); Daryl R. Harris, Evanston, IL (US); Cary D. Perttunen, Shelby Township, MI (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/352,162

(22) Filed: Jul. 12, 1999

Related U.S. Application Data

(62) Division of application No. 08/843,198, filed on Apr. 14, 1997.

(51) Int. Cl.[7] .................................................. H04Q 7/32
(52) U.S. Cl. ...................... 455/557; 455/556; 455/550; 455/575; 455/90; 455/74; 379/433.01; 379/428.01; 235/472.01; 235/472.02
(58) Field of Search ................................ 455/556, 557, 455/550, 575, 90, 566, 74; 379/433, 428, 428.01, 433.01, 433.05; 235/472.01, 472.02, 472.03, 462, 472

(56) References Cited

U.S. PATENT DOCUMENTS

| 3,818,190 A | 6/1974 | Silverman et al. ............ 455/557 |
| 3,999,042 A | 12/1976 | Silverman et al. ............ 455/557 |
| 4,044,227 A | 8/1977 | Holm et al. .................. 455/557 |

(List continued on next page.)

FOREIGN PATENT DOCUMENTS

| WO | WO 97/01137 | 1/1997 |
| WO | WO 98/03923 | 1/1998 |
| WO | WO 98/20411 | 5/1998 |

OTHER PUBLICATIONS

Tuiger Barcodzz Electronic LCD Game, Marvel Comics, X–Men, 1994.
AC&E Bar Code Information, http://www.intrepid.net/nscanhte/pagetwo.html.
Zuckerman, "It's a Brand New E–Mail, Companies Want to Turn Computers Into Postage Meters", *The New York Times*, Monday, Apr. 28, 1997.
O'Malley, "Web TV", 10 PS 96, pp. 49–53.
Randall, "Discover the World Wide Web with your Sportster", Samns.net.Publishing, 1996, (pp. 1–8).
"Advertising", *Community ConneXion, Inc.*, http://www.anonymixer.com/advert.html, 1995–1996, (p.1).
"The Anonymizer FAQ", *Community ConneXtion, Inc.*, http://www.anonymixer.com/faq.html, 1995–1996, (p.1–5).
"Receive Electronic Shipment Information via your PC," http://www.shiprps.com/service/access.thm, 1998.
"Postal Automation," http://www./ccmail.com/postal.html, No date.
"Bar Code Pro Software," http://www.ciag.com/bcp.htm, No date.
Pend Appln. Ser. No. 08/711,236, Inventor: Pisutha–Armond, Sep. 9, 1996.
"Using Marking Menus" article in Alias Introduction, pp. 24–28.
"DatO™ Patented Pointing Gesture System" by Evan Graham PhD., White Paper, 20 pp., Mar. 3, 1997.

*Primary Examiner*—Lee Nguyen
*Assistant Examiner*—Keith Ferguson
(74) *Attorney, Agent, or Firm*—Kenneth A. Haas (57) ABSTRACT

A handheld device comprises a housing and an optical reader supported by the housing. The housing can include a corner portion at which the optical reader is accessible. Alternatively, the housing can define a major exterior surface at which the optical reader is accessible. The optical reader can include a scanning beam reader responsive to an orientation of the handheld device.

2 Claims, 7 Drawing Sheets

U.S. PATENT DOCUMENTS

| | | | | |
|---|---|---|---|---|
| 4,721,849 A | | 1/1988 | Davis et al. | 455/557 |
| 4,801,789 A | | 1/1989 | Davis | 455/557 |
| 4,803,474 A | | 2/1989 | Kulp | 455/557 |
| 4,803,643 A | | 2/1989 | Hickey | 455/557 |
| 4,841,132 A | | 6/1989 | Kajitani et al. | 455/557 |
| 4,916,441 A | | 4/1990 | Gombrich | 455/557 |
| 4,937,853 A | | 6/1990 | Brule et al. | 455/557 |
| 5,115,326 A | | 5/1992 | Burgess et al. | 455/557 |
| 5,153,590 A | | 10/1992 | Charlier | 455/557 |
| 5,156,898 A | | 10/1992 | McDonald | 455/557 |
| 5,175,759 A | | 12/1992 | Metroka et al. | 455/557 |
| 5,280,625 A | | 1/1994 | Howarter et al. | 455/557 |
| 5,308,685 A | | 5/1994 | Froggatt | 455/557 |
| 5,319,562 A | | 6/1994 | Whitehouse | 455/557 |
| 5,331,136 A | | 7/1994 | Koenck et al. | 455/557 |
| 5,373,149 A | | 12/1994 | Rasmussen | 455/557 |
| 5,384,910 A | | 1/1995 | Torres | 455/557 |
| 5,386,568 A | | 1/1995 | Wold et al. | 455/557 |
| 5,410,141 A | | 4/1995 | Koenck et al. | 455/557 |
| 5,416,310 A | | 5/1995 | Little | 455/557 |
| 5,468,952 A | | 11/1995 | Alexander et al. | 455/557 |
| 5,477,044 A | * | 12/1995 | Aragon | 435/472.01 |
| 5,510,992 A | | 4/1996 | Kara et al. | 455/557 |
| 5,539,807 A | | 7/1996 | Ghisler et al. | 455/557 |
| 5,539,870 A | | 7/1996 | Conrad et al. | 455/557 |
| 5,548,722 A | | 8/1996 | Jalalian et al. | 455/557 |
| 5,552,806 A | | 9/1996 | Lenchik | 455/557 |
| 5,583,940 A | | 12/1996 | Vidrascu et al. | 455/557 |
| 5,590,197 A | | 12/1996 | Chen et al. | 455/557 |
| 5,602,918 A | | 2/1997 | Chen et al. | 455/557 |
| 5,606,507 A | | 2/1997 | Kara | 455/557 |
| 5,613,012 A | | 3/1997 | Hoffman et al. | 455/557 |
| 5,625,781 A | | 4/1997 | Cline et al. | 455/557 |
| 5,630,079 A | | 5/1997 | Mc Laughlin | 455/557 |
| 5,638,504 A | | 6/1997 | Scott et al. | 455/557 |
| 5,640,002 A | | 6/1997 | Ruppert et al. | 455/557 |
| 5,640,565 A | | 6/1997 | Dickenson | 455/557 |
| 5,656,804 A | | 8/1997 | Barkan et al. | 455/557 |
| 5,659,164 A | | 8/1997 | Schmid et al. | 455/557 |
| 5,664,110 A | | 9/1997 | Green et al. | 455/557 |
| 5,668,990 A | | 9/1997 | Bajorninas | 455/557 |
| 5,677,955 A | | 10/1997 | Doggett et al. | 455/557 |
| 5,689,642 A | | 11/1997 | Harkins et al. | 455/557 |
| 5,689,824 A | | 11/1997 | Nagai | 455/89 |
| 5,694,471 A | | 12/1997 | Chen et al. | 455/557 |
| 5,694,546 A | | 12/1997 | Resiman | 455/557 |
| 5,717,860 A | | 2/1998 | Graber et al. | 455/557 |
| 5,724,595 A | | 3/1998 | Genter | 455/557 |
| 5,734,371 A | | 3/1998 | Kaplan | 455/557 |
| 5,745,389 A | | 4/1998 | Russell | |
| 5,752,022 A | | 5/1998 | Chiu et al. | |
| 5,758,216 A | | 5/1998 | Arnold | |
| 5,796,088 A | * | 8/1998 | Wall | 435/472.01 |
| 5,804,803 A | | 9/1998 | Cragun et al. | |
| 5,815,830 A | | 9/1998 | Anthony | |
| 5,819,241 A | | 10/1998 | Reiter | 455/557 |
| 5,827,180 A | | 10/1998 | Goodman | |
| 5,834,749 A | | 11/1998 | Durbin | 455/557 |
| 5,851,186 A | | 12/1998 | Wood et al. | |
| 5,857,156 A | | 1/1999 | Anderson | 455/517 |
| 5,869,819 A | | 2/1999 | Knowles | 455/557 |
| 5,895,477 A | | 4/1999 | Orr et al. | |
| 5,905,248 A | | 5/1999 | Russell et al. | 455/557 |
| 5,905,251 A | | 5/1999 | Knowles | 455/557 |
| 5,918,214 A | | 6/1999 | Perkowski | 455/557 |
| 5,933,829 A | | 8/1999 | Durst et al. | 455/557 |

* cited by examiner

HANDHELD DEVICE HAVING AN OPTICAL DATA READER

RELATED APPLICATIONS

"The present application is divison of U.S. application Ser. No. 08/843,198 filed on Apr. 14, 1997, which is hereby incorporated by reference, and priority thereto for common subject matter is hereby claimed."

The present application is related to the following applications:

"Two-Way Communication Apparatus Having a Touchpad-Based User Interface", having Ser. No. 08/837,172, by Charlier et al., filed Apr. 14, 1997;

"Electronic Network Navigation Device and Method for Linking to an Electronic Address Therewith", having Ser. No. 08/710,820, filed Sep. 23, 1996;

"Methods and Systems for Providing a Resource in an Electronic Network", having Ser. No. 08/726,004, filed Oct. 4, 1996;

"An Apparatus for Reading an Electronic Network Navigation Device and a Peripheral for Use Therewith", having Ser. No. 08/732,956, filed Oct. 17, 1996; and "Method, System, and Article of Manufacture for Producing a Network Navigation Device", having Ser. No. 08/744,338, filed Nov. 7, 1996.

The subject matter of the above-identified related applications is hereby incorporated by reference into the disclosure of this application.

TECHNICAL FIELD

The present invention relates to devices having an optical data reader.

BACKGROUND OF THE INVENTION

Many forms of handheld devices having an integrated optical data reader are presently available. These forms include a wand form, a gun form, and a handheld computer form.

Wand-shaped devices are typically sized and shaped like a cigar. An optical data reader such as a bar code reader is accessible at an end of the device. The wand-shaped device is held like a pencil for swiping the optical data reader across a printed code such as a bar code.

Gun-type devices have a handle for holding like a gun. The device includes an optical data reader such as a scanning bar code reader. An end user aims the optical data reader toward a printed code. The optical data reader is activated and deactivated by a trigger promimate to the handle.

The handheld computer form has a bar code reader accessible at an end of a single housing. The single housing supports a keypad and a display in a manner similar to a handheld calculator.

BRIEF DESCRIPTION OF THE DRAWINGS

The invention is pointed out with particularity in the appended claims. However, other aspects of the invention are described with reference to the following detailed description in conjunction with the accompanying drawings in which:

DETAILED DESCRIPTION OF A PREFERRED EMBODIMENT

Embodiments of the present invention provide a handheld device having a data reader positioned either at a corner portion or a major surface of its housing. These positions facilitate ease of use in handling a housing of the data reader to read machine-readable data.

Figure 1:
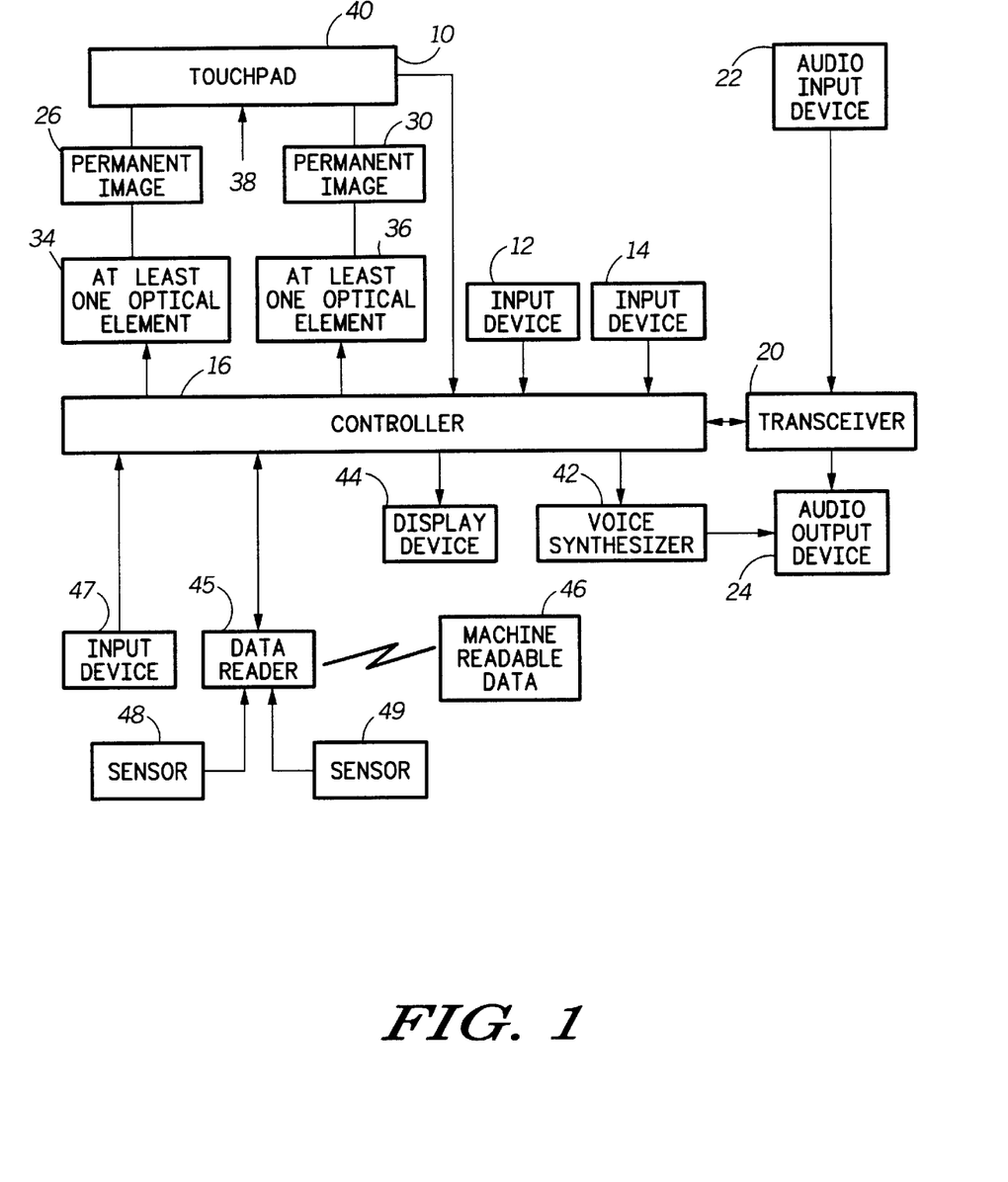
FIG. 1 is a block diagram of an embodiment of a handheld device in accordance with the present invention.

FIG. 1 is a block diagram of an embodiment of a handheld device in accordance with the present invention. The handheld device provides a two-way communication apparatus for communicating with a telephone network and an electronic network.

The two-way communication apparatus comprises at least one input device to receive user-initiated commands. Preferably, the at least one input device includes a touchpad 10. The touchpad 10 recognizes a location of a pointing member, such as a stylus or user's finger or thumb, on its surface and generates a signal representative of the location. Examples of the touchpad 10 include, but are not limited to, a resistive touchpad, a capacitive touchpad, and a pressure-sensitive touchpad.

Typically, the location of the pointing member on the surface of the touchpad 10 is represented by two parameters in a predetermined coordinate system. Preferably, the location is represented by an (x, y) coordinate using a Cartesian coordinate frame. In this case, the (x, y) coordinate can represent a row and a column indicative of the location.

Preferably, the at least one input device further includes a plurality of input devices such as a first input device 12 and a second input device 14. The first input device 12 can include a first button to receive a first user-initiated command. The second input device 14 can include a second button to receive a second user-initiated command.

The user-initiated commands received by the at least one input device direct the operation of the two-way communication apparatus. In particular, signals representative of user-initiated commands are communicated from the touchpad 10, the first input device 12, and the second input device 14 to a controller 16. The controller 16 includes a processor such as a microprocessor or a like integrated circuit to process data and to control the operation of the two-way communication apparatus.

The controller 16 processes the user-initiated commands in accordance with a predetermined control logic to control a transceiver 20. Examples of the transceiver 20 include, but are not limited to, a cellular telephone transceiver, a cordless telephone transceiver, a personal communication system (PCS) transceiver, a selective call receiver, a two-way pager transceiver, and other wireless transceivers.

The transceiver 20 transmits a first signal, such as a radio frequency signal, based upon a signal from an audio input device 22. Preferably, the audio input device 22 includes a microphone or a like transducer which generates a signal based upon acoustic pressure waves received thereby.

The transceiver 20 receives a second signal which also can be a radio frequency signal. The transceiver 20 drives an audio output device 24 based upon the second signal and/or the signal generated by the audio input device 22. Preferably, the audio output device 24 includes a speaker or a like transducer which generates an audible signal from a signal applied thereto.

The combination of the transceiver 20, the audio input device 22, and the audio output device 24 provides two-way voice and/or audio communication with a remote communication unit or a remote base station. For example, the combination can be included in a cordless telephone handset to communicate radio frequency signals representative of audio/voice with a cordless telephone base station. As another example, the combination can be included in a cellular telephone to communicate radio frequency signals representative of audio/voice with a cellular telephone network.

A plurality of permanent images, including a first permanent image 26 and a second permanent image 30, are associated with the touchpad 10. The first permanent image 26 is disposed at a first portion of the touchpad 10. The second permanent image 30 is disposed at a second portion of the touchpad 10.

The first permanent image 26 provides a first menu of commands for the two-way communication apparatus. Preferably, the first permanent image 26 includes a permanent image of a telephone keypad. The permanent image of the telephone keypad identifies locations on the touchpad 10 for receiving telephone-related commands. Examples of the telephone-related commands include, but are not limited to, dialing digits from 0 to 9, a pound key command, an asterisk key command, and wireless telephone commands such as send, end, recall, and clear.

The second permanent image 30 provides a second menu of commands for the two-way communication apparatus. Preferably, the second permanent image 30 includes a permanent image of at least one icon. Each of the at least one icon identifies a respective location on the touchpad 10 for receiving computer-related commands and/or electronic network navigation commands.

The first permanent image 26 is selectively concealed or made visible by a first at least one optical element 34. The second permanent image 30 is selectively concealed or made visible by a second at least one optical element 36. Three approaches for selectively concealing and selectively making visible each permanent image are described as follows. In each of these approaches, it is preferred that the entire touchpad 10 or portions thereof be transparent.

In a first approach, each of the first and the second at least one optical element 34 and 36 includes at least one illumination element such as an electroluminescent backlighting element or a light emitting diode. The at least one illumination element selectively backlights its corresponding permanent image from a back side 38 of the touchpad 10 so that the permanent image is visible from a front side 40 of the touchpad 10. It is noted that the first permanent image 26 and the second permanent image 30 can be disposed at either the front side 40 or the back side 38 of the touchpad 10 using this approach.

To make the first permanent image 26 visible from the front side 40 of the touchpad 10, the first at least one optical element 34 is illuminated. To conceal the first permanent image 26 from view at the front side 40, the first at least one optical element 34 is extinguished. Similarly, the second at least one optical element 36 is illuminated to make the second permanent image 30 visible from the front side 40, and is extinguished to conceal the second permanent image 30 from view at the front side 40.

In a second approach, each of the first and the second at least one optical element 34 and 36 includes at least one element whose reflectance of light is electrically variable. Preferably, each such element includes a liquid crystal display element having a light-reflective backing. The at least one light-reflecting element selectively absorbs and reflects light transmitted through the touchpad 10 and its corresponding permanent image from the front side 40. As with the first approach, the first permanent image 26 and the second permanent image 30 can be disposed at either the front side 40 or the back side 38 of the touchpad 10 using this approach.

To make the first permanent image 26 visible from the front side 40 of the touchpad 10, the first at least one optical element 34 is directed to reflect light. For example, a liquid crystal display element can be maintained in an unpowered state to reflect light. To conceal the first permanent image from view at the front side 40, the first at least one optical element 34 is directed to absorb light. For example, a liquid crystal display element can be directed to absorb light by applying a voltage or a current thereto. In a similar manner, the second at least one optical element 36 is directed to be light-reflective to make the second permanent image 30 visible from the front side 40, and is directed to be light-absorbent to conceal the second permanent image 30 from view at the front side 40.

In a third approach, each of the first and the second at least one optical element 34 and 36 includes at least one electrically-variable light-transmission element. An example of an electrically-variable light-transmission element is a transparent liquid crystal display element. A first at least one light-transmission element is interposed between the touchpad 10 and the first permanent image 26, and a second at least one light-transmission element is interposed between the touchpad 10 and the second permanent image 30. Light transmitted through the touchpad 10 from the front side 40 is selectively transmitted or screened from a permanent image by applying a corresponding signal to its corresponding light-transmission element.

In particular, the first at least one optical element 34 is directed to transmit light to make the first permanent image 26 visible from the front side 40 of the touchpad 10. For example, a transparent liquid crystal display element can be maintained in an unpowered state to transmit light therethrough. The first at least one optical element 34 is directed to impede light transmission therethrough to conceal the first permanent image 26 from view at the front side 40. For example, a voltage signal or a current signal can be applied to the transparent liquid crystal display element to impede the transmission of light therethrough. In a similar manner, the second at least one optical element 36 is made to be light-transmissive to make the second permanent image 30 visible from the front side 40, and is made to be light-impeding to conceal the second permanent image 30 from view at the front side 40.

In summary, the first at least one optical element 34 and the second at least one optical element 36 can vary an illumination, vary a reflectance of light, or vary a transmission of light to make its corresponding permanent image visible or concealed. Regardless of which approach is used, the first at least one optical element 34 and the second at least one optical element 36 are responsive to the controller 16. The controller 16 selectively activates and deactivates the optical elements 34 and 36 based upon user-initiated commands received by the at least one input device.

Preferably, the first permanent image 26 is made visible and the second permanent image 30 is concealed in response to a first user-initiated command received by the at least one input device. The first user-initiated command can be received by the touchpad 10 or by the first input device 12.

As described earlier, it is preferred that the first permanent image 26 includes a permanent telephone keypad image. When the first permanent image 26 is made visible and the second permanent image 30 is concealed, the two-way communication apparatus functions in a telephone mode. In this mode, the touchpad 10 accepts telephone commands to control the transceiver 20. Alternatively, telephone commands can be received and recognized using user initiated movements described with reference to FIG. 7.

Optionally, a voice synthesizer 42 is responsive to the controller 16 to form an audio signal indicative of commands received by the touchpad 10. The voice synthesizer 42 communicates with the audio output device 24 to provide an audio preview of telephone commands entered by the end user.

It is also preferred that the first permanent image 26 be concealed and the second permanent image 30 be made visible in response to a second user-initiated command received by the at least one input device. The second user-initiated command can be received by the touchpad 10 or by the second input device 14.

As described earlier, it is preferred that the second permanent image 30 includes a permanent icon image of at least one icon. When the first permanent image 26 is concealed and the second permanent image 30 is made visible, the two-way communication apparatus functions in a computer/network navigation mode. In this mode, the touchpad 10 accepts user-initiated input such as alphanumeric entry and network navigation commands. The alphanumeric entry can be recognized using handwriting recognition software such as Grafitti or Quickprint from Lexicus. Numeric entry can be recognized using a set of movements described with reference to FIG. 7.

A signal based upon the user-initiated input is communicated to an electronic network by the transceiver 20. Examples of the electronic network include, but are not limited to, an online service, the Internet, the World Wide Web, and an intranet.

The transceiver 20 receives signals from the electronic network for display by a display device 44. Preferably, the display device 44 includes a liquid crystal display having an array of independently-activated pixels for displaying graphics and text received from the electronic network.

The two-way communication apparatus includes a data reader 45 to read machine-readable data 46 representative of a navigation instruction for linking to a destination or a resource on the electronic network. The machine-readable data 46 can be supported by an embodiment of a network navigation device described in the above-listed patent applications incorporated by reference into this disclosure.

Preferably, the machine-readable data 46 includes an electronic address to identify the destination. The electronic address can include at least a portion of a URL (Uniform Resource Locator) or an IP (Internet Protocol) address for the destination. Alternatively, the machine-readable data 46 can include a code from which a node in the electronic network identifies the destination.

To link to the destination, the end user reads the machine-readable data 46 using the data reader 45. The data reader 45 communicates a signal associated with the machine-readable data 46 to the controller 16. The controller 16 directs the transceiver 20 to communicate the navigation instruction to the electronic network to link to the destination.

In addition to the navigation instruction, the machine-readable data 46 can include instructions to direct the controller 16 to execute a predetermined client routine such as a predetermined browser routine. Also, the machine-readable data 46 can instruct the controller 16 to execute a predetermined network provider access routine. For example, the machine-readable data 46 can include a dialing instruction such as a telephone number to connect the transceiver 20 to a predetermined service provider, and a login instruction to log on to the predetermined service provider.

The form of the data reader 45 is dependent upon the form of the machine-readable data 46. For printed data, the data reader 45 can include an optical imaging reader such as a bar code reader, a scanning beam reader, a linear CCD (charge coupled device) reader, or a two-dimensional CCD reader. For magnetically-stored data, the data reader 45 can include a magnetic reader such as a magnetic read head of a magnetic stripe reader. For electronically-stored data, the data reader 45 can include a suitable electronic interface or a receiver.

Preferably, the machine-readable data 46 includes printed data such as a one-dimensional bar code or a two-dimensional bar code. Examples of one-dimensional bar codes include, but are not limited to, 3 of 9, UPC-A, Code 128, Codabar, MSI, Extended 3 of 9, Code 93, Extended Code 93, Industrial 2 of 5, Standard 2 of 5, Code 11, and UCC/EAN-128. Examples of two-dimensional bar codes include, but are not limited to, DataMatrix and PDF417.

Optionally, the two-way communication apparatus includes an input device 47 to selectively activate and deactivate the data reader 45. The controller 16 is responsive to the input device 47 to prepare to receive data from the data reader 45.

As another option, the two-way communication apparatus includes a first orientation sensor 48 and a second orientation sensor 49. The data reader 45 includes a scanning beam optical reader responsive to the first orientation sensor 48 and the second orientation sensor 49. The scanning beam optical reader scans a light beam along an axis dependent upon an orientation of the two-way communication apparatus.

Figure 2:
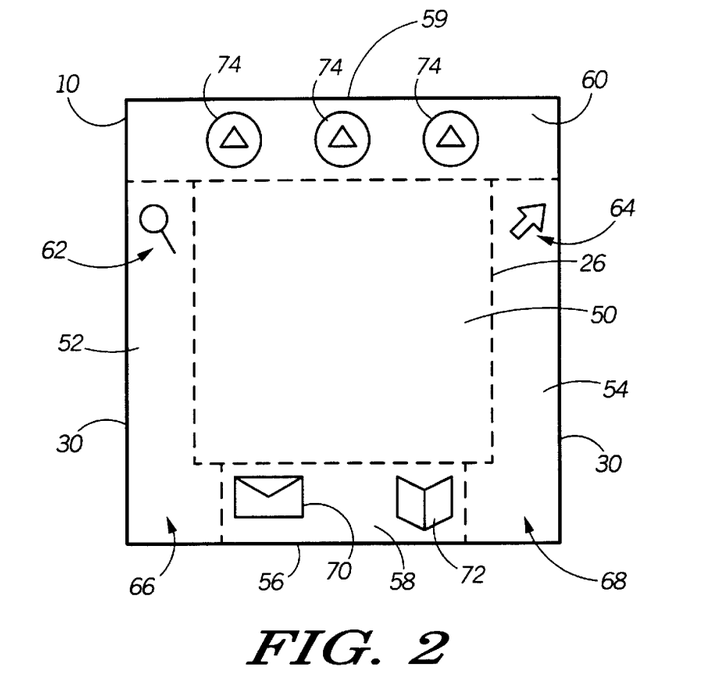
FIG. 2 is a plan view of an embodiment of the touchpad having permanent images in accordance with the present invention.

FIG. 2 is a plan view of an embodiment of the touchpad 10 having permanent images in accordance with the present invention. The touchpad 10 includes the first permanent image 26 at a portion 50, the second permanent image 30 distributed over portions 52 and 54, a third permanent image 56 at a portion 58, and a fourth permanent image 59 at a portion 60. The first permanent image 26, the second permanent image 30, the third permanent image 56 and the fourth permanent image 59 can be patterned on a front surface or a back surface of the touchpad 10. Alternatively, the first permanent image 26, the second permanent image 30, the third permanent image 56, and the fourth permanent image 59 can be patterned on a transparent sheet of material which is applied to the front surface or the back surface of the touchpad 10.

As illustrated, the first permanent image 26 includes a permanent telephone keypad image. The permanent telephone keypad image includes images for dialing digits from 0 to 9, an asterisk symbol, and a pound symbol.

The second permanent image 30 includes a plurality of permanent icon images. The permanent icon images include a first icon 62 at a position of the touchpad 10 for initiating a zoom command, a second icon 64 at a position for initiating a cursor command, a third icon 66 at a position for initiating a fax command, and a fourth icon 68 at a position for initiating a network command.

The third permanent image 56 includes a fifth icon 70 for initiating an electronic mail command and a sixth icon 72 for initiating a phone book command. The fourth permanent image 59 includes function key icons 74 corresponding to functions displayed on the display device 44.

Figure 3:
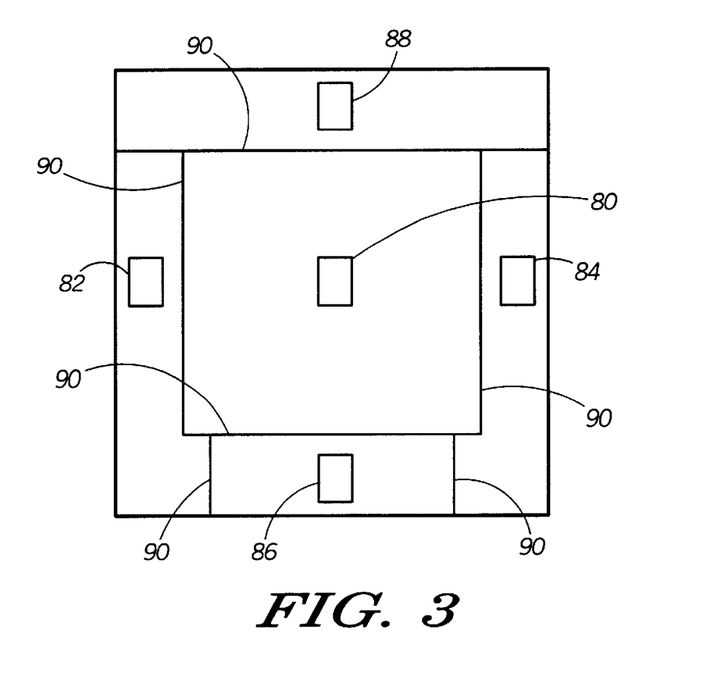
FIG. 3 is a plan view of a backlighting apparatus for selectively concealing and making visible each of the permanent images of FIG. 2.

FIG. 3 is a plan view of a backlighting apparatus for selectively concealing and making visible each of the permanent images of FIG. 2. The backlighting apparatus includes a first backlighting element 80 disposed at a first position to selectively illuminate the portion 50 of the touchpad 10, a second backlighting element 82 disposed at a second position to selectively illuminate the portion 52 of the touchpad 10, a third backlighting element 84 disposed at a third position to selectively illuminate the portion 54 of the touchpad 10, a fourth backlighting element 86 disposed at a fourth position to selectively illuminate the portion 58 of the touchpad 10, and a fifth backlighting element 88 disposed at a fifth position to selectively illuminate the portion 60 of the touchpad 10.

With reference to FIG. 1, the backlighting element 80 forms the first at least one optical element 34, and the backlighting elements 82 and 84 form the second at least one optical element 36. Each of the backlighting elements 80, 82, 84, 86, and 88 is responsive to the controller 16. Preferably, each of the backlighting elements 80, 82, 84, 86, and 88 is embodied by a light emitting diode or an electroluminescent member.

The touchpad 10 of FIG. 2 is placed over the backlighting apparatus of FIG. 3 to provide selective illumination of the permanent images. The backlighting apparatus further includes barriers 90 between adjacent portions of the touchpad 10. The barriers 90 block illumination from a backlighting element to each adjacent portion of the touchpad 10. The barriers 90 can be formed by walls, seals, or the like.

Figures 4, 5:
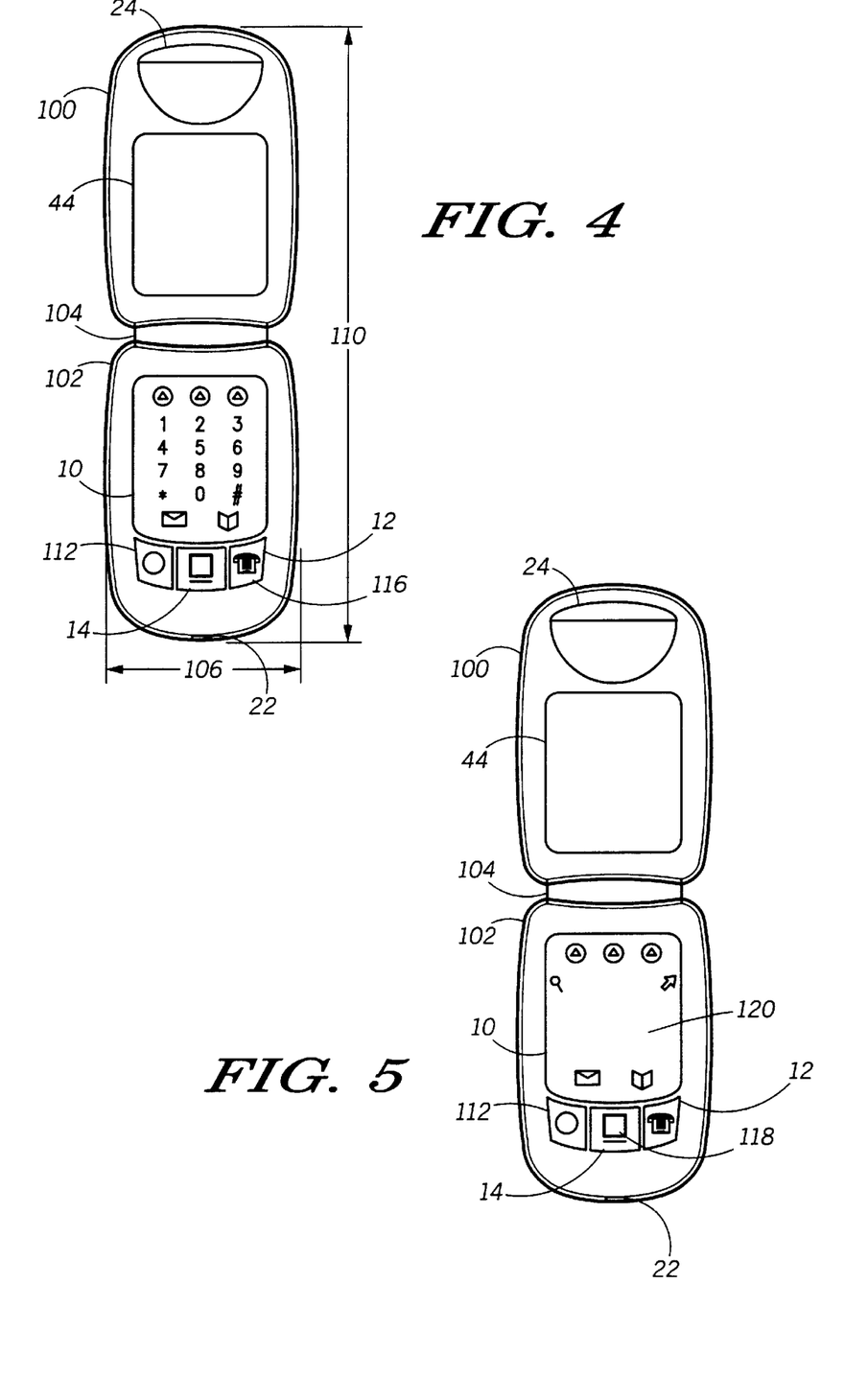
FIG. 4 is a plan view of an embodiment of a handheld device in accordance with the present invention.
FIG. 5 is a plan view of the embodiment of FIG. 4 in a computer mode.

FIG. 4 is a plan view of an embodiment of a handheld device in accordance with the present invention. The handheld device includes a housing 100 and a housing 102. The housing 100 is pivotally connected to the housing 102 by a hinge 104. In an open state, the handheld device has a width 106 of about 52 mm and a length 110 of about 180.06 mm.

The housing 100 supports the audio output device 24 and the display device 44. The housing 102 supports the touchpad 10 having permanent images described with reference to FIG. 2, the backlighting apparatus described with reference to FIG. 3, and the audio input device 22. The housing 102 further supports a power button 112, the first input device 12 in the form of a button for initiating a telephone mode, and the second input device 14 in the form of a button for initiating a computer mode. It is noted that the transceiver 20, the controller 16, the voice synthesizer 42, and a battery (not specifically illustrated) can be supported by either the housing 100 or the housing 102.

The handheld device is illustrated in a telephone mode, wherein the first permanent image 26, the third permanent image 56, and the fourth permanent image 59 are visible, and the second permanent image 30 is concealed. In this mode, the controller 16 has illuminated the first backlighting element 80, the fourth backlighting element 86, and the fifth backlighting element 88, and has extinguished the second backlighting element 82 and the third backlighting element 84.

The telephone mode can be initiated upon depressing the power button 112 or upon depressing the first input device 12. The first input device 12 has a telephone icon 116 associated therewith to indicate its function as a telephone mode button. In the telephone mode, the end user can enter telephone commands by touching the indicated portions of the touchpad 10. In this way, the end user can use the handheld device to dial a phone number to initiate a telephone call, or to answer an incoming telephone call. Thereafter, the end user can verbally communicate with another party using the audio input device 22 and the audio output device 24.

FIG. 5 is a plan view of the embodiment of FIG. 4 in a computer mode. In this mode, the first permanent image 26 is concealed from view, and the second permanent image 30 and the third permanent image 56 are visible. For this purpose, the controller 16 has extinguished the first backlighting element 80, and has illuminated the second backlighting element 82, the third backlighting element 84, the fourth backlighting element 86, and the fifth backlighting element 88.

The computer mode is initiated upon depressing the second input device 14. The second input device 14 has a computer-related icon 118 associated therewith to indicate its function as a computer mode button. In the computer mode, the end user can enter computer-related commands by touching the indicated portions of the touchpad 10. Additionally, user-initiated point and click commands can be received from a portion 120 located at a midsection of the touchpad 10. Further, user-initiated movements indicative of textual data can be received from the portion 120 of the touchpad 10. The portion 120 is in the same general area as the concealed dialing digits. In this way, the handheld device can be used as a network navigation apparatus for browsing World Wide Web pages and other resources in an electronic network.

Figures 6, 8:
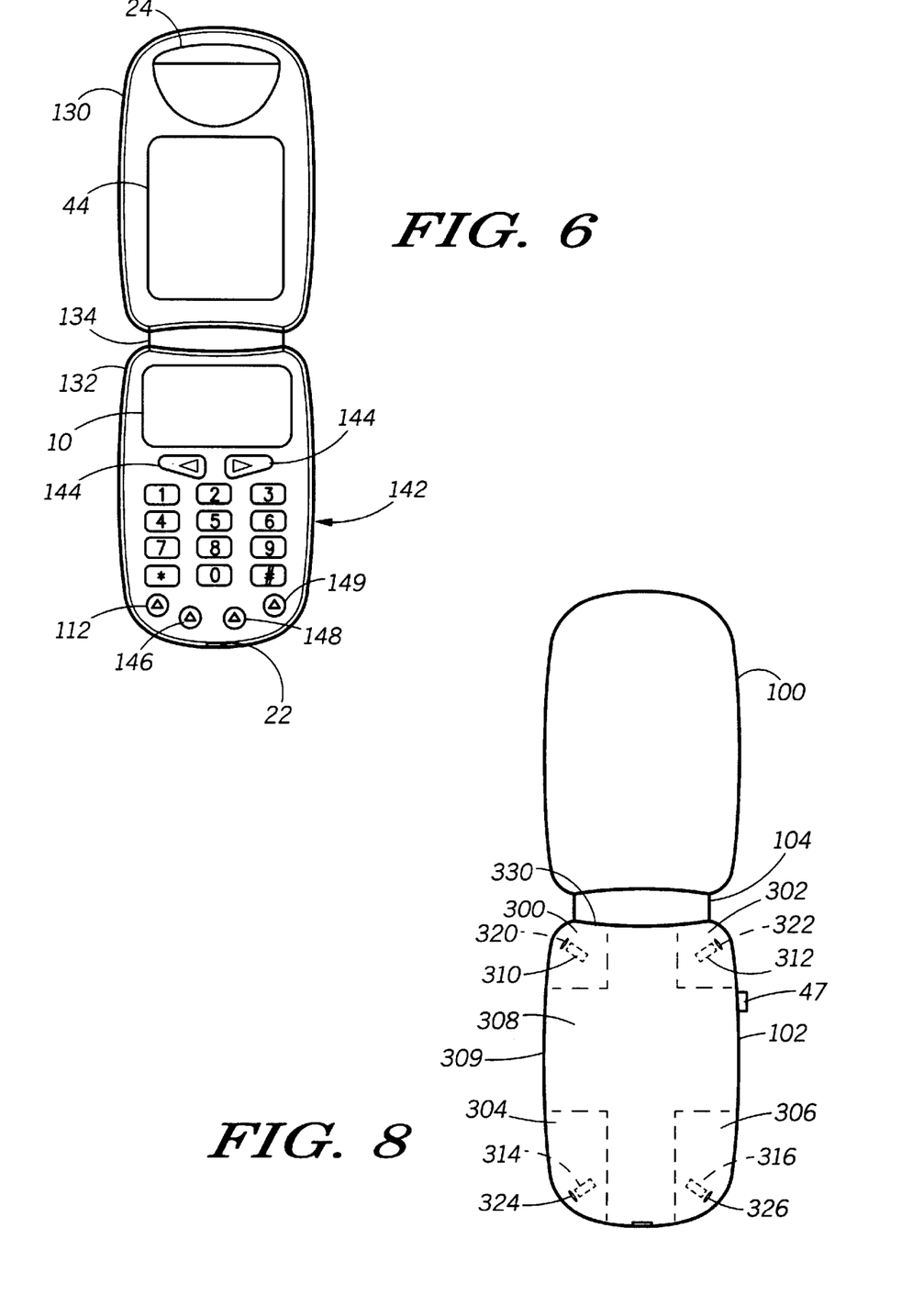
FIG. 6 is a plan view of another embodiment of a handheld device in accordance with the present invention.
FIG. 8 is a back view of an embodiment of a handheld device having the data reader.

FIG. 6 is a plan view of another embodiment of a handheld device in accordance with the present invention. The handheld device includes a housing 130 and a housing 132. The housing 130 is pivotally connected to the housing 132 by a hinge 134. In an open state, the handheld device has a width of about 52 mm and a length of about 180.06 mm.

The housing 130 supports the audio output device 24 and the display device 44. The housing 132 supports the touchpad 10, a telephone keypad 142, scroll keys 144, the audio input device 22, the power button 112, a recall key 146, a store key 148, and a quick access key 149. The transceiver 20, the controller 16, the voice synthesizer 42, and a battery (not specifically illustrated) can be supported by either the housing 130 or the housing 132.

For operation in a computer mode, user-initiated computer commands and/or network navigation commands are received by the touchpad 10. In this way, the two-way communication apparatus can be used to navigate and browse resources of an electronic network.

For operation in a telephone mode, user-initiated telephone commands are received either by the telephone keypad 142 (which communicates signals representative thereof to the controller 16) or by the touchpad 10. A preferred set of movements for entering telephone commands using the touchpad 10 is described with reference to FIG. 7. Thereafter, the handheld device can be used to communicate as a telephone. Telephone numbers can be stored and recalled using the store key 148 and the recall key 146, respectively.

Figure 7:
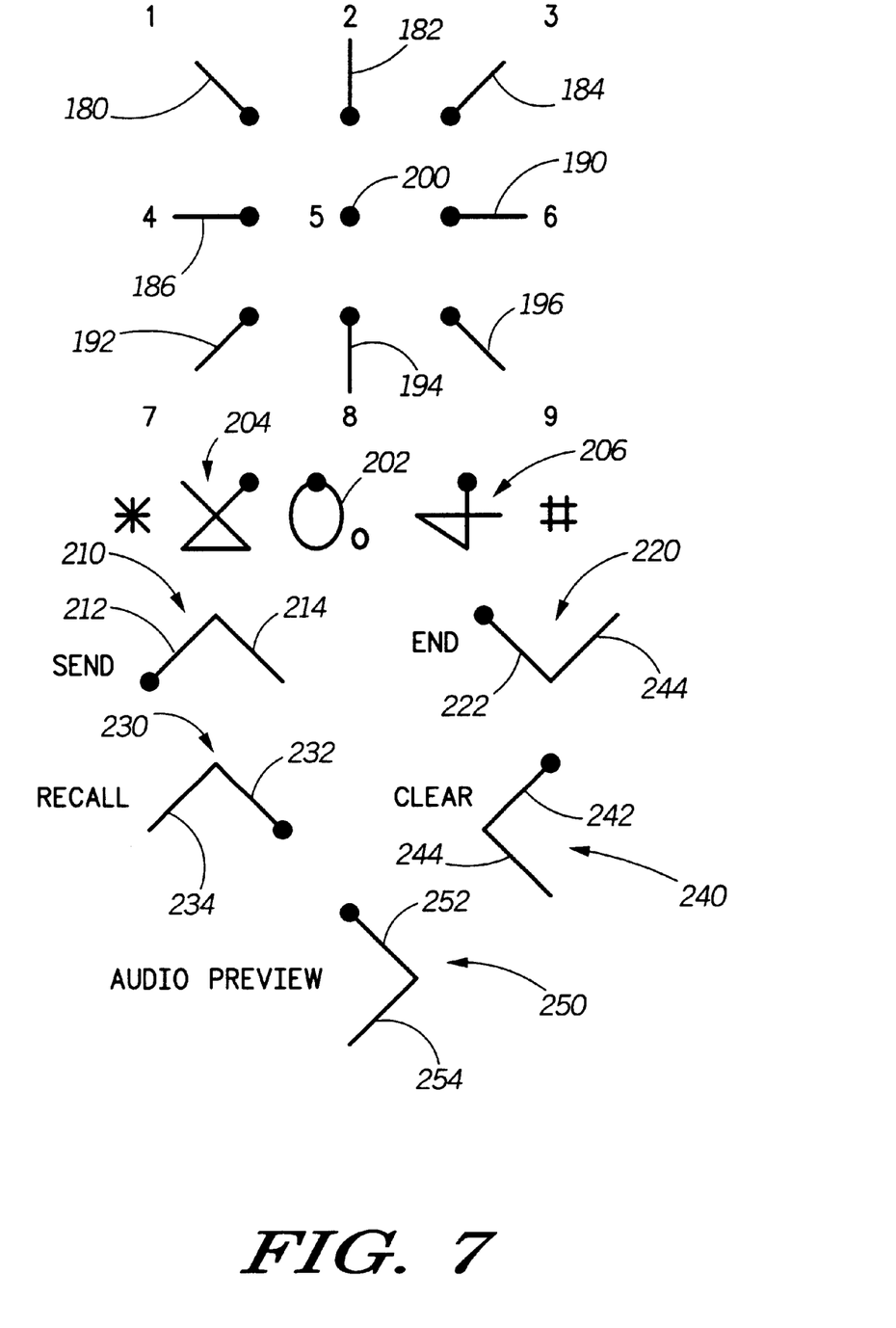
FIG. 7 is an illustration of a preferred set of movements for entering telephone commands using the touchpad.

FIG. 7 is an illustration of a preferred set of movements for entering telephone commands using the touchpad 10. Generally, the controller 16 is responsive to the touchpad 10 to recognize a plurality of single-directional strokes. The single-directional strokes can include a first single-directional stroke indicative of a first telephone command such as a first dialing digit, and a second single-directional stroke indicative of a second telephone command such as a second dialing digit. The controller 16 further recognizes a tap movement and a circular movement indicative of other telephone commands such as other dialing digits. Still further, the controller 16 recognizes two-stroke movements indicative of other telephone commands. These commands can include wireless telephone commands such as send, end, recall, and clear.

Preferably, for digits "1" to "9", each corresponding movement includes a motion that the end user would make in blindly locating its corresponding key using a standard keypad. More specifically, each corresponding movement for the digits from "1" to "9" includes a motion from the "5" key to the desired key. Hence, each of digits "1", "2", "3", "4", "6", "7", "8", and "9" has a unique single-directional stroke 180, 182, 184, 186, 190, 192, 194, and 196 respectively, associated therewith. The "5" digit is represented by a tap stroke 200. It is noted that the solid dots illustrated in FIG. 7 identify starting points for the movements.

The movements for the digits "1" to "9" can be recognized by the controller 16 by determining an angle of stroke motion, and comparing the angle to an angle range associated with each digit. The angle of stroke motion can be determined by fitting a line segment to the (x, y) location data generated by the touchpad 10, and determining the angle from the slope of the line segment and the direction of motion. Without loss of generality, the angle of stroke motion is measured counterclockwise from a horizontal vector to the right.

Using the aforementioned convention for angles, the movements can be described as follows. The movement for the "1" digit consists of a single-directional stroke having an angle of about 135°. The movement for the "2" digit consists of a single-directional stroke having an angle of about 90°. The movement for the "3" digit consists of a single-directional stroke having an angle of about 45°. The movement for the "4" digit consists of a single-directional stroke having an angle of about 180°. The movement for the "6" digit consists of a single-directional stroke having an angle of about 0°. The movement for the "7" digit consists of a single-directional stroke having an angle of about 225°. The movement for the "8" digit consists of a single-directional stroke having an angle of about 270°. The movement for the "9" digit consists of a single-directional stroke having an angle of about 315°. The angle range for each of digits "1", "2", "3", "4", "6", "7", "8", and "9" can be a range of the aforementioned nominal angles ±22.50.

The movement for the "5" digit consists of a tap of the touchpad 10. The movement for the "0" digit consists of a loop motion movement 202. The loop motion movement 202 can be recognized independently of its starting point, if desired.

A movement for an asterisk consists of a three-stroke movement 204. The three-stroke movement 204 includes a first stroke having an angle of about 315°, a second stroke having an angle of about 180°, and a third stroke having an angle of about 45°. A movement for a pound key consists of a three-stroke movement 206. The three-stroke movement 206 includes a first stroke having an angle of about 270°, a second stroke having an angle of about 135°, and a third stroke having an angle of about 0°.

Other telephone commands are represented by two-stroke movements received by the touchpad 10. A movement for a send command consists of a two-stroke movement 210 with a first stroke 210 having an angle of about 45°and a second stroke 212 having an angle of about 315°. A movement for an end command consists of a two-stroke movement 220 with a first stroke 222 having an angle of about 315° and a second stroke 224 having an angle of about 45°. A movement for a recall command consists of a two-stroke movement 230 with a first stroke 232 having an angle of about 135° and a second stroke 234 having an angle of about 225°. A movement for a clear command consists of a two-stroke movement 240 with a first stroke 242 having an angle of about 225° and a second stroke 244 having an angle of about 315°.

A movement for an audio preview command consists of a two-stroke movement 250 with a first stroke 252 having an angle of about 315° and a second stroke 254 having an angle of about 225°. Upon receiving the audio preview command, the controller 16 commands the voice synthesizer 42 to convert entered dialing digits to a voice representation for playback by the audio output device 24. In this way, the end user can confirm that movements were correctly recognized.

Preferably, all of the above-described movements are recognized as relative movements. As a result, the recognition of a movement is independent of its starting point on the touchpad 10.

FIGS. 8 to 11 illustrate alternative locations for integrating the data reader 45 described with reference to FIG. 1 with the handheld device. The alternative locations are illustrated from a back view of the handheld device in relation to the views given in FIGS. 4 to 6. Although FIGS. 8 to 11 show the housings 100 and 102 described with reference to FIGS. 4 and 5, the housings 130 and 132 described with reference to FIG. 6 can be substituted therefor.

FIG. 8 is a back view of an embodiment of a handheld device having the data reader. The housing 102 has corner portions 300, 302, 304, and 306. The corner portions 300, 302, 304, and 306 can include a surface 308, a side surface 309, and/or a surface opposite to the surface 308 (which can be seen in FIGS. 4 and 5).

The data reader 45 described with reference to FIG. 1 is supported by the housing 102 and is accessed from any one or more of the corner portions 300, 302, 304, 306. Preferably, the data reader 45 includes at least one optical reader, such as a printed code reader or a bar code reader, which is accessible from at least one of the corner portions 300, 302, 304, and 306. For example, the housing 102 can support an optical reader 310 accessible at the corner portion 300, an optical reader 312 accessible at the corner portion 302, an optical reader 314 accessible at the corner portion 304, and/or an optical reader 316 accessible at the corner portion 306.

Each of the optical readers 310, 312, 314, and 316 has a fixed position with respect to the housing 102. Each of the optical readers 310, 312, 314, and 316 can be mounted to a surface of the housing 102, or can be mounted to a support member (such as a circuit board) within the housing 102. If the optical readers 310, 312, 314, and 316 are mounted within the housing 102, the housing 102 can define openings 320, 322, 324, and 326 at the corner portions 300, 302, 304, and 306 respectively. The optical readers 310, 312, 314, and 316 are accessible at the openings 320, 322, 324, and 326 to read printed data external to the housing 102.

Preferably, the handheld device includes the optical reader 310 and/or the optical reader 312. The optical readers 310 and 312 are located at the corner portions 300 and 302 adjacent to an edge 330 at which the housing 100 is pivotally connected to the housing 102. Including two optical readers, one at each of two corner portions, is advantageous to facilitate both right-handed use and left-handed use.

To read the machine-readable data 46 described with reference to FIG. 1, the end user grasps a network navigation device supporting the machine-readable data 46 in one hand and grasps the handheld device in the other hand. The end user manipulates the handheld device so that one of the optical readers 310, 312, 314, and 316 is proximate to the machine-readable data 46 (which is, preferably; a printed code such as a bar code).

Optionally, the end user depresses the input device 47 such as a button to activate the optical reader. Thereafter, the end user either swipes the optical reader across the machine-readable data 46 or directs a scanning beam toward the machine-readable data 46. To promote a flush contact of a corner portion with a surface supporting the machine-readable data 46, the corner portion can include a beveled portion at which the optical reader is accessible.

The optical reader reads the machine-readable data 46 and communicates a signal representative thereof to the controller 16. In response thereto, the controller 16 commands the transceiver 20 to link to a destination or a resource associated with the machine-readable data 46. Content from the destination is communicated from the electronic network to the transceiver 20 and displayed by the display device 44.

The optical reader can read the machine-readable data 46 when the handheld device is in an open position (as illustrated) or a closed position. It is noted that the handheld device is opened and closed by pivoting the housing 100 with respect to the housing 102. In response to reading the machine-readable data 46, the transceiver 20 can link to and download content from the destination regardless of whether the handheld device is opened or closed.

In the case of the machine-readable data 46 being read when the handheld device is in a closed position, the end user can thereafter pivot the housing 100 with respect to the housing 102 so that the content displayed by the display device 44 is viewable. This is advantageous in reducing a number of steps needed to download content from a destination (e.g. powering the device, manually entering a data mode, manually connecting to a service provider, and manually entering an electronic address).

Figure 9:
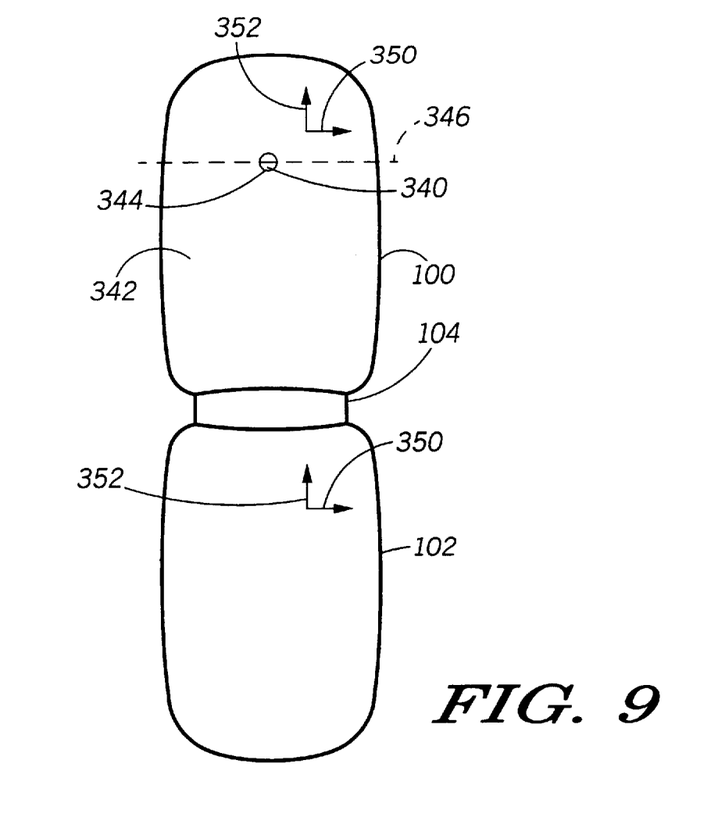
FIG. 9 is a back view of another embodiment of a handheld device having a data reader.

FIG. 9 is a back view of another embodiment of a handheld device having a data reader. An optical reader 340 is supported in a fixed position by the housing 100. Preferably, the optical reader 340 includes a printed code reader such as a bar code reader.

The optical reader 340 is accessible at a major exterior surface 342 of the housing 100. The major exterior surface 342 is opposite to a face of the housing 100 which supports the display device 44. The major exterior surface 342 is exposed both when the housing 100 is pivoted to a closed position with respect to the housing 102, and when the housing 100 is pivoted to an open position (as illustrated) with respect to the housing 102.

The optical reader 340 can be supported at a position exterior to the housing 100. Alternatively, the housing 100 can define an opening 344 at the major exterior surface 342 through which the optical reader 340 is accessed.

Optionally, the optical reader 340 can comprise a scanning beam optical reader which scans a light beam along a first axis 346 for a first orientation of the handheld device. The first orientation is sensed by at least one of the orientation sensors 48 and 49 described with reference to FIG. 1.

In this case, the orientation sensor 48 senses an orientation along an axis 350. The orientation sensor 49 senses an orientation along an axis 352. The axis 352 is transverse to, and preferably perpendicular to, the axis 350. The axis 352 can be aligned with the length of the housing 100, and the axis 350 can be aligned with the width of the housing 100. Alternatively, the axis 352 can be aligned with the length of the housing 102, and the axis 350 can be aligned with the width of the housing 102.

In one embodiment, the orientation sensors 48 and 49 generate signals associated with a deviation from a horizontal axis. Preferably, each of the orientation sensors 48 and 49 includes a corresponding at least one inclinometer for this purpose. Alternatively, the orientation sensors 48 and 49 can include motion sensors, angular rate sensors, gyros, or the like.

The first orientation for which the light beam is scanned across the first axis 346 can include orientations for which a deviation-from-horizontal for the axis 350 is within a predetermined range. The predetermined range can be ±45° from horizontal or ±30° from horizontal, for example, for the axis 350.

Figure 10:
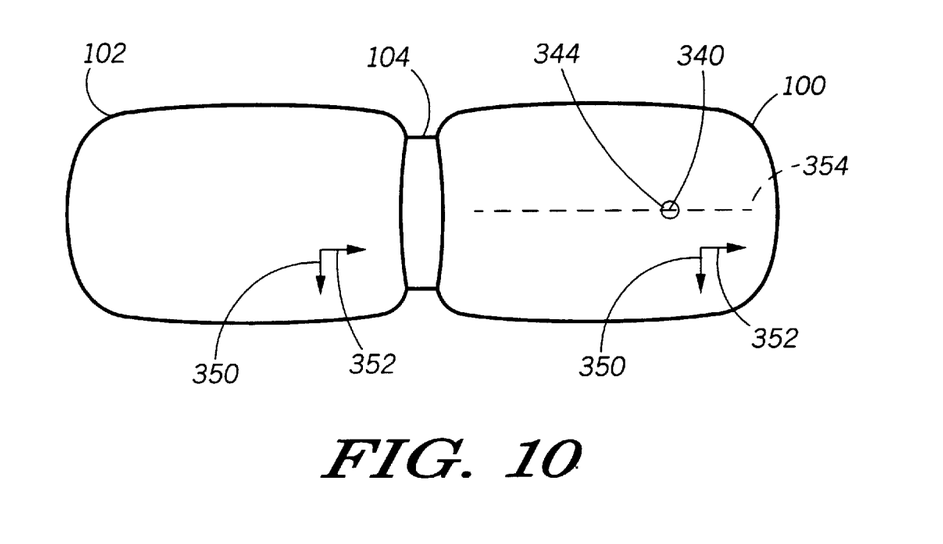
FIG. 10 is a back view of the handheld device of FIG. 9 in a second orientation.

FIG. 10 is a back view of the handheld device of FIG. 9 in a second orientation. The second orientation includes orientations for which a deviation-from-horizontal for the axis 352 is within a predetermined range. The predetermined range can be ±45° from horizontal or ±30° from horizontal, for example, for the axis 352.

In the second orientation, the scanning beam optical reader which scans a light beam along a second axis 354. The second axis 354 is transverse to the first axis 352, and is preferably perpendicular to the first axis 352. The second axis 354 can be parallel to the axis 352.

To read the machine-readable data 46 using embodiments of the handheld device described with reference to FIGS. 9 and 10, the end user grasps a network navigation device in one hand and grasps the handheld device in the other hand. The end user manipulates the network navigation device behind the handheld device so that the machine-readable data 46 is proximate to the optical reader 340.

Optionally, the end user depresses the input device 47 such as a button to activate the optical reader 340. Thereafter, the end user either swipes the optical reader 340 across the machine-readable data 46 or directs a scanning beam toward the machine-readable data 46. The optical reader 340 reads the machine-readable data 46 and communicates a signal representative thereof to the controller 16. The controller 16 commands the transceiver 20 to link to a destination or a resource associated with the machine-readable data 46. Content from the destination is communicated from the electronic network to the transceiver 20 and displayed by the display device 44.

The embodiment described with reference to FIGS. 9 and 10 is advantageous in automatically varying the scanning axis of the light beam in dependence upon the orientation of the handheld device. Regardless of whether the handheld device is oriented to display content in a portrait mode (FIG. 9) or in a landscape mode (FIG. 10), the light beam is scanned horizontally to read horizontally-oriented bar codes.

Figure 11:
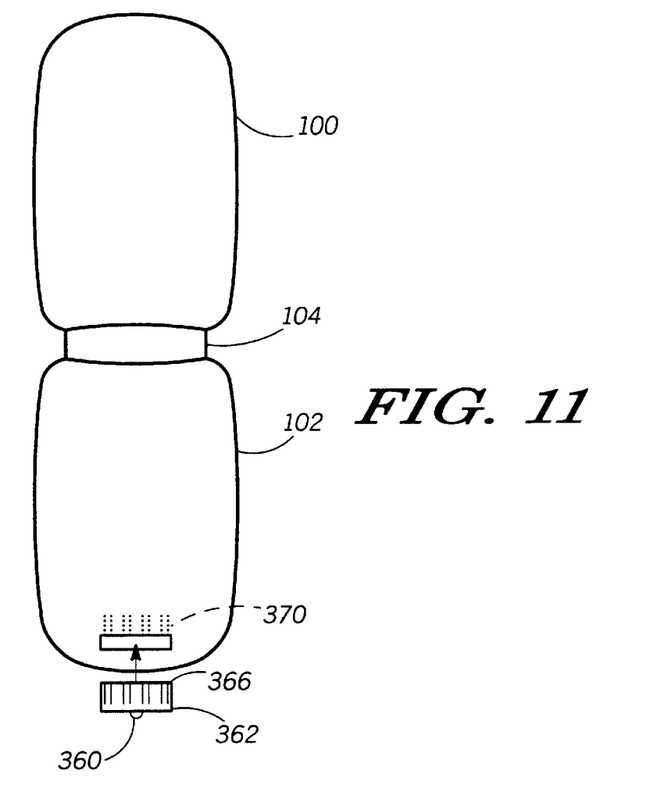
FIG. 11 is a view of another embodiment of a handheld device having an optical reader.

FIG. 11 is a view of another embodiment of a handheld device having an optical reader 360. In this embodiment, the optical reader 360 is integrated in an accessory 362 for the handheld device.

The accessory 362 includes an interface 366 in communication with the optical reader 360. The interface 366 mates with a port 370 of the handheld device. Via this connection, a signal representative of machine-readable data read by the optical reader 360 is communicated to circuits (such as the controller 16 and the transceiver 20) in the handheld device.

In one preferred case, the interface 366 is capable of mating with-other wireless telephone ports, such as data ports in cellular telephones, for example. In another preferred case, the interface 366 mates with a dedicated port for receiving signals representative of machine-readable data.

As illustrated, the accessory 362 can be mounted to an end of the handheld device. In general, the accessory 362 can be mounted anywhere on the handheld device. If desired, the accessory 362 can be integrated with a battery pack which powers the handheld device.

Although illustrated for handheld devices having the form of a flip phone handset or a clam shell handset, it is noted that the scope of the present invention is inclusive of other telephone handsets having an optical reader supported by a telephone handset housing. Further, other examples of handheld devices which can have an integrated optical reader as taught herein include but are not limited to a remote controller, a personal digital assistant, a palmtop computer, and a two-way pager.

Figure 12:
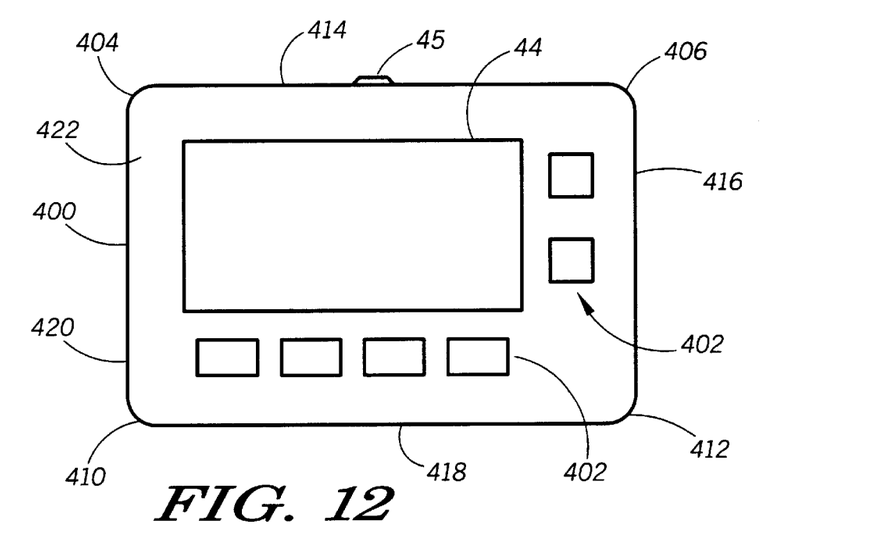
FIG. 12 is a view of a further embodiment of a handheld device in accordance with the present invention.

FIG. 12 is a view of a further embodiment of a handheld device in accordance with the present invention. The handheld device comprises a pager housing 400 which supports a user interface 402, the display device 44, and the data reader 45. Preferably, the handheld device comprises a two-way pager such as a Tango™ two-way pager by Motorola, Inc. adapted to include the data reader 45 as an input device. As a result, paging messages sent from the handheld device to a paging network can be formed and/or initiated using the data reader 45.

The data reader 45 can be accessible at any of corner portions 404, 406, 410, and 412 of the pager housing 400. Alternatively, the data reader 45 can be accessible at any of side portions 414, 416, 418, and 420 of the pager housing 400. Further alternative positions for accessing the data reader 45 include a front surface 422 or a back surface (not specifically illustrated) of the pager housing 400. Regardless of its position, it is preferred that the data reader 45 includes optical reader such as a printed code reader or a bar code reader.

Thus, there has been described herein several embodiments including preferred embodiments of a handheld device having an optical reader.

Because the various embodiments of the present invention include a data reader at a corner portion of a handheld housing, they provide a significant improvement in providing a comfortable wrist position for reading machine-readable data. Further, by including two optical readers, one at each of two corner portions, both right-handed use and left-handed use are facilitated.

Additionally, by automatically varying an axis of a scanning light beam in dependence upon an orientation of the handheld device, a printed code having a predetermined orientation can be read in a plurality of orientations of the handheld device.

It will be apparent to those skilled in the art that the disclosed invention may be modified in numerous ways and may assume many embodiments other than the preferred form specifically set out and described above.

Accordingly, it is intended by the appended claims to cover all modifications of the invention which fall within the true spirit and scope of the invention.

What is claimed is:

1. A handheld device comprising:

a display device capable of displaying information in a portrait mode, the display device further capable of displaying information in a landscape mode;

a housing which supports the display device;

at least one orientation sensor to sense an orientation of the housing;

a scanning beam optical reader to scan a light beam across an optical code, the scanning beam optical reader responsive to the at least one orientation sensor to scan the light beam along a first axis if the housing is oriented for displaying information in the portrait mode and along a second axis if the housing is oriented for displaying information in the landscape mode, wherein the first axis is transverse to the second axis; and wherein the at least one orientation sensor includes a first inclinometer and a second inclinometer, the first inclinometer to generate a signal based upon a deviation between a horizontal axis and an axis substantially parallel to the first axis, the second inclinometer to generate a signal based upon a deviation between the horizontal axis and an axis substantially parallel to the second axis.

2. The handheld device of claim 1 wherein the first axis is perpendicular to the second axis.

* * * * *